(12) United States Patent
Saito et al.

(10) Patent No.: US 10,765,095 B2
(45) Date of Patent: Sep. 8, 2020

(54) LINE CLIP FOR SPINNING REEL, AND SPOOL FOR SPINNING REEL HAVING LINE CLIP

(71) Applicant: Shimano Inc., Sakai, Osaka (JP)

(72) Inventors: Kei Saito, Sakai (JP); Takuji Takamatsu, Sakai (JP); Satoshi Ikebukuro, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 108 days.

(21) Appl. No.: 16/214,625

(22) Filed: Dec. 10, 2018

(65) Prior Publication Data

US 2019/0200591 A1  Jul. 4, 2019

(30) Foreign Application Priority Data

Dec. 28, 2017 (JP) .................................. 2017-253126

(51) Int. Cl.
*A01K 89/01* (2006.01)
*B65H 75/28* (2006.01)

(52) U.S. Cl.
CPC ........ *A01K 89/0111* (2013.01); *B65H 75/285* (2013.01)

(58) Field of Classification Search
CPC .......... A01K 89/0111; A01K 89/01121; B65H 2701/355; B65H 7/285
See application file for complete search history.

(56) References Cited

U.S. PATENT DOCUMENTS

| 4,875,639 A | * | 10/1989 | Zurcher | ............ A01K 89/0111 242/309 |
| 4,883,238 A | * | 11/1989 | Harder | ................. A01K 89/016 242/317 |
| 9,210,919 B2 | * | 12/2015 | Hui | ..................... A01K 89/0111 |
| 2003/0136868 A1 | * | 7/2003 | Carlebach | .......... A01K 89/0111 242/322 |
| 2010/0213304 A1 | * | 8/2010 | McCall | .................. A01K 97/06 242/579 |
| 2015/0028143 A1 | * | 1/2015 | Hiraoka | ............. A01K 89/0111 242/322 |

FOREIGN PATENT DOCUMENTS

| EP | 2198706 A1 | * | 6/2010 | ............ A01K 89/01 |
| EP | 2210486 A1 | * | 7/2010 | ............ A01K 89/01 |
| EP | 2829174 A1 | * | 1/2015 | ............ A01K 89/01 |
| GB | 2505009 | * | 2/2014 | ............ A01K 89/01 |
| JP | 2017-201888 A | | 11/2017 | |

* cited by examiner

*Primary Examiner* — Emmanuel M Marcelo
(74) *Attorney, Agent, or Firm* — United IP Counselors, LLC (57) ABSTRACT

A line clip includes a mounting member that is mountable to a spool of the spinning reel and a clip body that is able to clip a fishing line. The clip body has a main body, a first projection, a second projection, and a groove. The main body extends from the mounting member. The first projection projects from the main body. The second projection projects from the main body between the mounting member and the first projection. The groove is formed in a concave shape in the main body between the first projection and the second projection.

14 Claims, 8 Drawing Sheets

LINE CLIP FOR SPINNING REEL, AND SPOOL FOR SPINNING REEL HAVING LINE CLIP

CROSS-REFERENCE TO RELATED APPLICATIONS

This application claims priority to Japanese Patent Application No. 2017-253126, filed Dec. 28, 2017, the contents of which are incorporated by reference in their entirety.

BACKGROUND

Technical Field

The present disclosure relates to a spinning reel line clip and a spool of a spinning reel having the same.

Background Information

In a conventional spinning reel, the spool of the spinning reel has a bobbin trunk around which fishing line is wound and a skirt portion. A line clip and a sheet member are provided in the skirt portion. For an example of a conventional spinning reel, refer to Japanese Unexamined Patent Application Publication No. 2017-201888 (Patent Document 1). The line clip has the purpose of clipping one end of the fishing line. The line clip includes a mounting portion for mounting the line clip to the skirt portion, a main body extending from the mounting portion, projections for preventing separation of the fishing line, and a recess in which the fishing line can be arranged. The sheet member is disposed between the line clip and the skirt portion. The fishing line is arranged between the line clip and the sheet member.

In the conventional line clip, on the lower surface of the main body (clip in Patent Document 1) are provided a projection (first projection in Patent Document 1) that is disposed at a position closer to the bobbin trunk of the spool than the position where the main body and the mounting portion (attachment portion in Patent Document 1) are connected, and a projection (second projection in Patent Document 1) arranged at a position farther from the bobbin trunk of the spool than the connection position of the mounting portion.

In other words, these two projections (the first projection and the second projection of Patent Document 1) are respectively provided on opposite sides of the mounting portion. It is possible to individually clip a small-diameter and a large-diameter fishing line by making the distance between each projection and the mounting portion different. Further, for fishing line of a large diameter, the recess that accommodates the fishing line is provided between the projection (the second projection of Patent Document 1) disposed at a position further from the bobbin trunk of the spool than the position where the main body and the mounting portion are connected and the mounting portion.

In such a configuration of a conventional line clip, the fishing line is clipped at either side of the mounting portion depending on whether the fishing line has a small diameter or a large diameter. For this reason, there is a risk of the angler inadvertently mounting a small-diameter fishing line in the large-diameter mounting area (the area between the attachment portion and the second projection in Patent Document 1), or mounting a large-diameter fishing line in the small-diameter mounting area (the area between the attachment portion and the first projection in Patent Document 1). When that happens, the problem arises of not being able to securely clip the fishing line.

In particular, in the configuration of the conventional line clip, the recess for accommodating the large-diameter fishing line is provided in the large-diameter mounting area. While an extremely large-diameter fishing line will be accommodated in the recess, a typical large-diameter fishing line may only be clipped on the mounting portion side of the line clip without being accommodated in the recess. That is, since the fishing line can move in the large-diameter mounting range, the problem arises in which the clip position of the fishing line is unstable, preventing the fishing line from being securely clipped.

BRIEF SUMMARY

The present disclosure has been made in view of the above problems, and it is an object of the present disclosure to provide a line clip that allows an angler to easily arrange a fishing line at a predetermined position of the line clip, and enables an angler to securely keep the fishing line at the predetermined position of the line clip.

A line clip according to one aspect of the present disclosure has a mounting member that is mountable to a spool of a spinning reel and a clip body that is able to clip a fishing line. The clip body has a main body, a first projection, a second projection, and a recess. The main body extends from the mounting member. The first projection projects from the main body. The second projection projects from the main body between the mounting member and the first projection. The recess is formed in a concave shape in the main body between the first projection and the second projection.

In this line clip, in the case of a fishing line with a large diameter, the fishing line upon passing over the first projection is arranged in the recess between the first projection and the second projection. In this case, the fishing line is prevented from slipping out by the first projection and the second projection. In the case of a small-diameter fishing line, after passing over the first projection, the fishing line passes over the second projection. Thereby, the fishing line is arranged between the second projection and the mounting member. In this case, the fishing line is prevented from slipping out by the second projection and the mounting member, with the present line clip, an angler can easily arrange the fishing line at a predetermined position of the line clip. In addition, the angler can securely keep the fishing line at a predetermined position of the line clip regardless of whether the fishing line has a small diameter or a large diameter.

In the line clip according to another aspect of the present disclosure, the main body preferably has a tapered portion that is provided between an outer edge and the recess, and a non-tapered portion that bulges in thickness from the tapered portion between the mounting member and the recess.

The angler can easily guide the fishing line from the outer edge to the recess using the tapered portion. Also, the angler can directly arrange the fishing line between the second projection and the mounting member on the non-tapered portion.

In the line clip according to another aspect of the present disclosure, the main body preferably has a guide surface for guiding a fishing line from a corner of the outer edge to the mounting member.

The angler can easily guide the fishing line from the corner of the outer edge to the mounting member using the guide surface.

In the line clip according to another aspect of the present disclosure, the main body preferably further has a connection surface that connects a surface formed between the mounting member and the second projection, and the guide surface.

When the fishing line is detached from the clip body, the fishing line can be smoothly guided from the surface formed between the mounting member and the second projection to the guide surface by the connection surface.

In the line clip according to another aspect of the present disclosure, the clip body is preferably made of a thermoplastic resin.

Compared with the case in which the clip body is made of a plastic material, the fishing line can be smoothly clipped to the clip body and made less likely to slip out of the clip body.

A spool of a spinning reel according to one aspect of the present disclosure is provided with a bobbin trunk, a skirt portion, and the aforementioned line clip. The bobbin trunk is configured to allow fishing line to be wound on the outer peripheral surface thereof. The skirt portion is provided on the bobbin trunk and is configured to have a diameter larger than the diameter of the bobbin trunk. The line clip is disposed in the skirt portion.

Due to the spool having the line clip, an angler can easily arrange the fishing line at a predetermined location of the line clip. In addition, the angler can securely keep the fishing line at a predetermined position of the line clip.

The spool of a spinning reel according to another aspect of the present disclosure is further provided with a sheet member. The sheet member is disposed between the skirt portion and the line clip. The sheet member has a hole in which a fishing line can be disposed.

By arranging the fishing line in the hole of the sheet member, it is possible to reliably prevent the fishing line from slipping out.

In the spool of a spinning reel according to another aspect of the present disclosure, it is preferable that a fishing line be disposed in the hole, between the recess and the skirt portion.

It is possible to securely sandwich the fishing line with the recess and the sheet member in the state of being disposed in the hole.

In the spool of a spinning reel according to another aspect of the present disclosure, the first projection and the second projection are preferably disposed in the hole.

It is possible to mount the line clip on the skirt portion without increasing the projection amount of the line clip with respect to the skirt portion.

In the spool of a spinning reel according to another aspect of the present disclosure, the sheet member is preferably configured to be able to make contact with a surface of the main body formed between the mounting member and the second projection. A fishing line is disposed between the surface of the main body formed between the mounting member and the second projection, and the sheet member.

It is possible to securely sandwich the fishing line with the surface of the main body formed between the mounting member and the second projection, and the sheet member.

In a spool of a spinning reel according to another aspect of the present disclosure, the skirt portion preferably has a hole in which a fishing line can be disposed.

By disposing the fishing line in the hole of the skirt portion, it is possible to reliably prevent the fishing line from slipping out.

In the spool of a spinning reel according to another aspect of the present disclosure, a fishing line is disposed between the hole and the recess.

It is possible to securely sandwich the fishing line with the recess and a surface of the skirt portion in the state of being disposed in the hole.

In the spool of a spinning reel according to another aspect of the present disclosure, the first projection and the second projection are preferably disposed in the hole.

It is possible to mount the line clip on the skirt portion without increasing the projection amount of the line clip with respect to the skirt portion.

In the spool of a spinning reel according to another aspect of the present disclosure, the skirt portion is preferably configured to be able to make contact with a surface of the main body formed between the mounting member and the second projection. A fishing line is disposed between the surface of the main body formed between the mounting member and the second projection, and a surface of the skirt portion.

It is possible to securely sandwich the fishing line by the surface of the main body formed between the mounting member and the second projection, and the surface of the skirt portion.

According to the present disclosure, an angler can easily arrange a fishing line at a predetermined position of the line clip, and the angler can securely keep the fishing line at the predetermined position of the line clip.

DETAILED DESCRIPTION OF EMBODIMENTS

Figure 1:
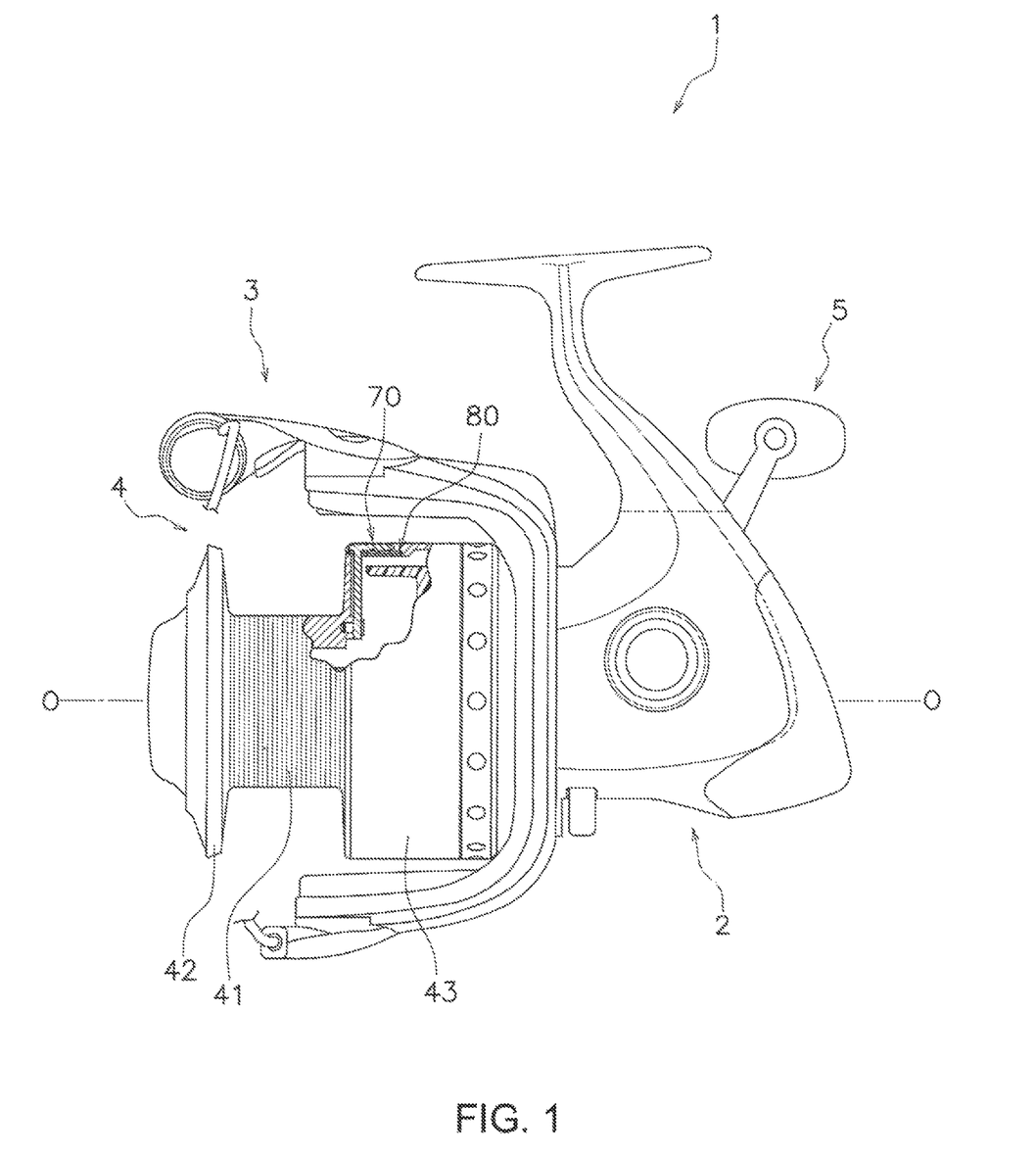
FIG. 1 is a side view of a spinning reel in which one embodiment of the present disclosure is adopted.

A preferred embodiment of a spinning reel 1 will be described with reference to the drawings. As shown in FIG. 1, the spinning reel 1 includes a reel body 2, a rotor 3, and a spool 4.

The reel body 2 rotatably supports a handle 5. The rotor 3 is for winding fishing line onto the spool 4. The rotor 3 is rotatably supported by the reel body 2. The fishing line is wound onto the spool 4.

Hereinbelow, the term "axial direction" denotes the direction in which rotation center O of the rotor 3 extends. In the axial direction, the direction in which the fishing line is cast is defined as "front", while the opposite direction is referred to as "rear".

In a circle centered on the rotation center O of the rotor 3, a direction heading away from the rotation center O of the rotor 3 is defined as "radial direction". In a circle centered on the rotation center O of the rotor 3, a direction heading around the rotation center O of the rotor 3 is defined as "circumferential direction".

The spool 4 is mounted on the reel body 2 via a spool shaft (not shown) so as to be movable in a front-rear direction with respect to the rotor 3. The axis center of the spool shaft is concentric with the rotation center O of the rotor 3.

The spool 4 is provided with a bobbin trunk 41, a front flange 42, a skirt portion 43, and a line clip 70. The spool 4 is further provided with a sheet member 80.

The bobbin trunk 41 is configured to allow fishing line to be wound around the outer peripheral surface thereof. For example, the bobbin trunk 41 is formed substantially in a cylindrical shape. The front flange 42 is formed integrally with a front portion of the bobbin trunk 41. The front flange 42 is formed larger in diameter than the bobbin trunk 41. The front flange 42 projects outward in the radial direction from the bobbin trunk 41 and is formed in a substantially annular shape.

Figure 2:
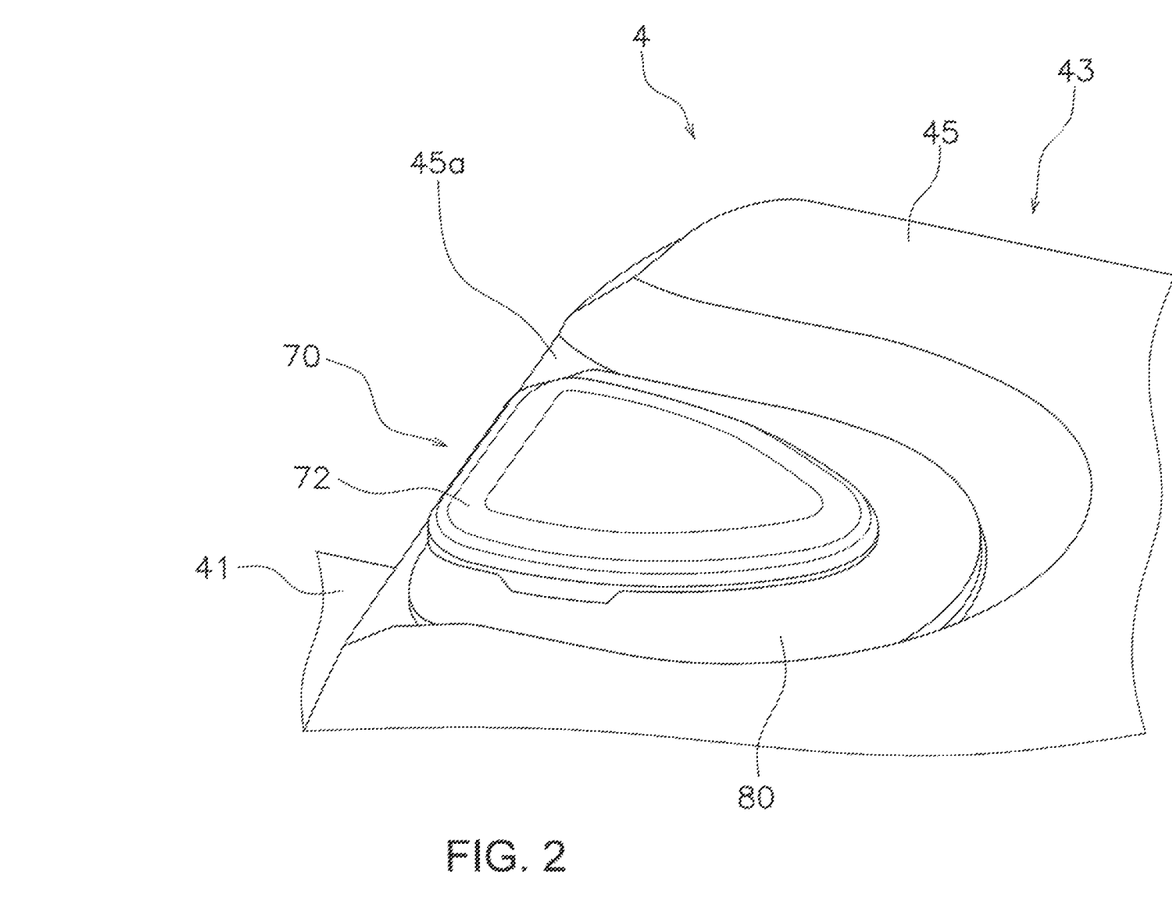
FIG. 2 is an external perspective view of a line clip mounted to a spool.
Figure 3:
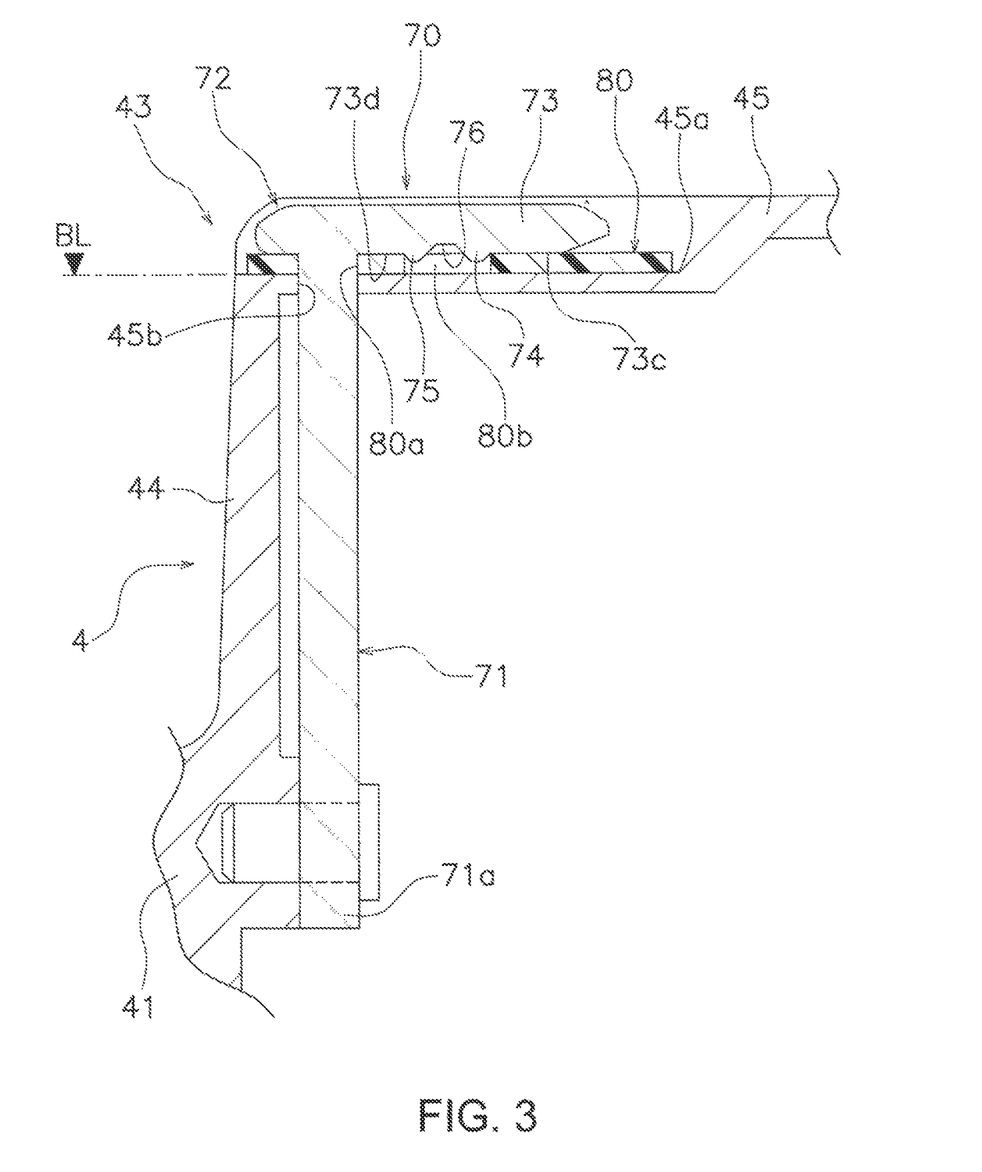
FIG. 3 is an enlarged cross-sectional view of the line clip mounted to the spool.

As shown in FIGS. 1 to 3, the skirt portion 43 is integrally formed with a rear portion of the bobbin trunk 41. The skirt portion 43 is formed larger in diameter than the bobbin trunk 41. The skirt portion 43 has a rear flange 44 projecting outward in the radial direction from the bobbin trunk 41 and a cylindrical member 45 extending in the axial direction from the rear flange 44 (see FIG. 3).

As shown in FIGS. 2 and 3, a recess 45a and a through-hole 45b are formed in the cylindrical member 45. The recess 45a is recessed inward in the radial direction from the outer peripheral surface of the cylindrical member 45. In the recess 45a, the line clip 70, for example, a clip body 72 (described later) is disposed. The through-hole 45b is formed in the bottom of the recess 45a (see FIG. 3). More specifically, the through-hole 45b penetrates the cylindrical member 45 from the bottom of the recess 45a toward the inside in the radial direction. The through-hole 45b is formed in a polygonal shape. Here, the through-hole 45b is formed in a substantially rectangular shape. In the through-hole 45b, a mounting member 71 (described later) of the line clip 70 to be described later is inserted.

[Line Clip]

The line clip 70 is configured to be mountable on the spool 4. As shown in FIGS. 2 and 3, the line clip 70 is disposed on the skirt portion 43. The line clip 70 is molded with a thermoplastic resin such as an elastomer. The line clip 70 has a mounting member 71 that can be mounted in the spool 4 and the clip body 72 that is able to clip the fishing line.

[Mounting Member]

As shown in FIG. 3, the mounting member 71 is a member to be mounted to the spool 4. The mounting member 71 is provided on the clip body 72. For example, the mounting member 71 is formed integrally with the clip body 72. The mounting member 71 protrudes from the clip body 72. The mounting member 71 is formed long in one direction. A cross section of the mounting member 71 is formed in a polygonal shape. Here, the mounting member 71 is formed substantially in a rectangular shape.

The mounting member 71 is inserted in a first hole 80a (described later) of the sheet member 90 and the through-hole 45b of the skirt portion 43. A distal end 71a of the mounting member 71 is fixed to a rear surface of the skirt portion 43, for example, a rear surface of the rear flange 44 by a fixing member, for example, a screw. Here, "the distal end of the mounting member 71 is fixed to a rear surface of the skirt portion 43 (a rear surface of the rear flange 44)" may be interpreted as "the distal end of the mounting member 71 is fixed to the bobbin trunk 41".

[Clip Body]

The clip body 72 is configured to be capable of clipping fishing line, and is one example of clipping means for clipping fishing line. As shown in FIGS. 2 and 3, the clip body 72 is formed integrally with the mounting member 71 (see FIG. 3). The clip body 72 is disposed on the skirt portion 43. Specifically, the clip body 72 is disposed in the recess 45a in the cylindrical member 45.

Figure 4:
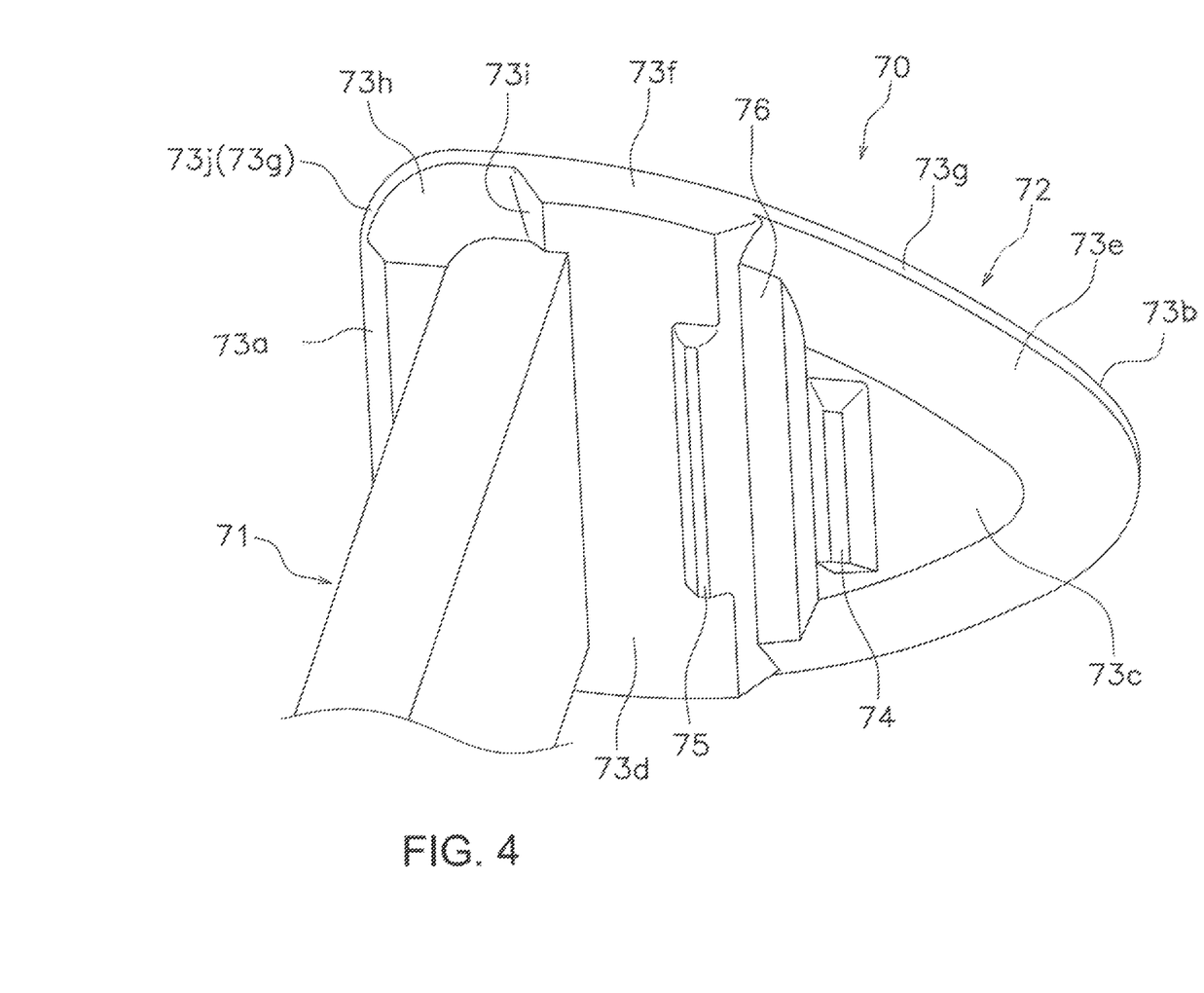
FIG. 4 is an external perspective view of the line clip.

As shown in FIGS. 3 and 4, the clip body 72 is provided with a main body 73, a first projection 74, a second projection 75, and a groove 76 (an example of a recess and of means for receiving fishing line). The main body 73 extends from the mounting member 71 in a direction heading away from the bobbin trunk 41 of the spool. For example, the main body 73 is formed substantially in a plate shape so as to surround the base end of the mounting member 71. The main body 73 is disposed to face the cylindrical member 45 of the skirt portion 43. More specifically, the main body 73 is arranged to face the recess 45a in the cylindrical member 45 via the sheet member 80.

As shown in FIG. 4, the main body 73 has a mounting end 73a and an insertion end 73b. The mounting member 71 is provided on the mounting end 73a. The insertion end 73b is formed in a tapered shape. The fishing line is inserted from the insertion end 73b toward the mounting member 71 of the mounting end 73a.

As shown in FIG. 4, the main body 73 further has a first surface 73c and a second surface 73d. The first surface 73c is provided between the insertion end 73b and the first projection 74. The first surface 73c is arranged spaced apart from the skirt portion 43, for example, the bottom of the recess 45a (see FIG. 3). The sheet member 80 is disposed between the first surface 73c and the bottom of the recess 45a in the skirt portion 43. The first surface 73c is in contact with the sheet member 80.

The second surface 73d is provided between the second projection 75 and the mounting member 71. The second surface 73d is flush with the first surface 73c. The second surface 73d is disposed spaced apart from the skirt portion 43, for example, the bottom of the recess 45a (see FIG. 3). The sheet member 80 is disposed between the second surface 73d and the bottom BL of the recess 45a in the skirt portion 43.

The second surface 73d makes contact with the sheet member 80. As a result, when the fishing line is disposed between the second surface 73d and the sheet member 80, the fishing line is sandwiched by the second surface 73d and the sheet member 80.

As shown in FIG. 4, the main body 73 further includes a tapered portion 73e and a non-tapered portion 73f. The tapered portion 73e guides the fishing line from an outer edge 73g toward the first projection 74, and is an example of guide means for guiding fishing line into position. The tapered portion 73e is provided between the outer edge 73g and the first projection 74. Further, the tapered portion 73e is provided between the outer edge 73g and the groove 76.

The tapered portion 73e is a sloping surface that connects the outer edge 73g with the first surface 73c, and the outer edge 73g with the bottom of the groove 76. For example, the tapered portion 73e extends from the outer edge 73g toward the first surface 73c between the outer edge 73g of the insertion end 73b and the first projection 74. Further, the tapered portion 73e extends from the outer edge 73g to the bottom of the groove 76 between the outer edge 73g of the insertion end 73b and the groove 76.

The non-tapered portion 73f forms an outer edge between the mounting member 71 and the groove 76. The non-tapered portion 73f bulges in thickness from the tapered portion 73e, with the bulge extending between the mounting member 71 and the groove 76. The non-tapered portion 73f makes contact with the sheet member 80. The portion where the non-tapered portion 73f makes contact with the sheet member 80 is included in the second surface 73d.

Figure 5:
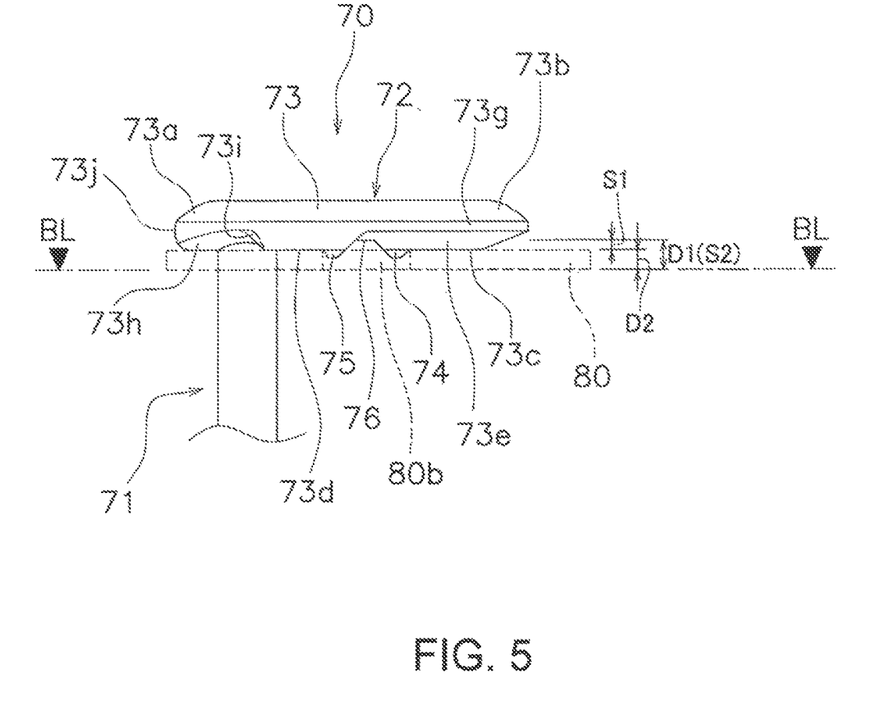
FIG. 5 is a side view of the line clip.

As shown in FIGS. 4 and 5, the main body 73 further has a guide surface 73h and a connection surface 73i. The guide surface 73h guides the fishing line from a corner 73j of the outer edge 73g at the mounting end 73a to the mounting member 71. The guide surface 73h is provided at the mounting end 73a.

For example, the guide surface 73h is provided at the mounting end 73a, between the corner 73j of the outer edge 73g at the mounting end 73a and the mounting member 71. The guide surface 73h is connected to the mounting member 71 while curving in a concave shape from the corner 73j toward the mounting member 71. The guide surface 73h is also connected to the connection surface 73i. The connection surface 73i is thus one example of connecting means.

As shown in FIG. 5, the guide surface 73h is disposed spaced apart from the skirt portion 43, for example, the bottom BL of the recess 45a, in the radial direction. A space for guiding the fishing line from the corner 73j to the connection surface 73i is provided between the guide surface 73h and the sheet member 80.

As shown in FIGS. 4 and 5, the connection surface 73i guides the fishing line from the second surface 73d (guide surface 73h) to the guide surface 73h (the second surface 73d). The connection surface 731 is provided at the mounting end 73a.

For example, the connection surface 73i is provided in the mounting end 73a in the vicinity of a corner of the mounting member 71. The connection surface 73i connects the second surface 73d and the guide surface 73h. Specifically, the connection surface 73i connects the second surface 73d formed by the non-tapered portion 73f and the guide surface 73h.

In this case, as shown in FIG. 5, the connection surface 73i is formed so that the minimum angle formed by the connection surface 73i and the second surface 73d becomes an obtuse angle when the line clip 70 is viewed sideways. Accordingly, it is possible to guide the fishing line from the guide surface 73h (the second surface 73d) to the second surface 73d (the guide surface 73h) without having the fishing line interfere with the non-tapered portion 73f.

The connection surface 73i is arranged spaced apart from the skirt portion 43, for example, the bottom BL of the recess 45a, in the radial direction. A space for guiding the fishing line from the guide surface 73h (second surface 73d) to the second surface 73d (guide surface 73h) is provided between the connection surface 73i and the sheet member 80.

The first projection 74 restrains slipping out of the fishing line disposed between the groove 76 and the sheet member 80. As shown in FIGS. 4 and 5, the first projection 74 projects out from the main body 73. More specifically, the first projection 74 projects out from the first surface 73c of the main body 73. The first projection 74 extends along the groove 76 (see FIG. 4).

The second projection 75 restrains slipping out of the fishing line disposed between the second surface 73d and the sheet member 80. As shown in FIGS. 4 and 5, the second projection 75 projects out from the main body 73 between the mounting member 71 and the first projection 74. More specifically, the second projection 75 projects out from the second surface 73d of the main body 73. The second projection 75 is disposed spaced apart from the first projection 74 and extends along the groove 76 (see FIG. 4).

The fishing line can be arranged in the groove 76. As shown in FIGS. 4 and 5, the groove 76 is formed in the main body 73 between the first projection 74 and the second projection 75. The groove 76 is formed in a concave shape with respect to the first surface 73c and the second surface 73d.

As shown in FIG. 3, the groove 76 is disposed so as to face the recess 45a in the skirt portion 43 via the sheet member 80. As shown in FIG. 5, a distance D1 between the bottom of the groove 76 and the bottom BL of the recess 45a in the skirt portion 43 is larger than a distance D2 between the second surface 73d and the bottom BL of the recess 45a in the skirt portion 43.

A first gap S1 for sandwiching the fishing line is formed between the bottom of both ends of the groove 76 and the sheet member 80. A second hole 80b (described later) of the sheet member 80 is disposed between the bottom of the central portion of the groove 76 and the bottom BL of the recess 45a in the skirt portion 43. As a result, a second gap S2 for arranging the fishing line is formed between the bottom of the central portion of the groove 76 and the bottom BL of the recess 45a in the skirt portion 43. The second gap S2 is larger than the first gap S1.

[Sheet Member]

As shown in FIGS. 2 and 3, the sheet member 80 is disposed between the skirt portion 43 and the line clip 70. Specifically, the sheet member 80 is disposed between the recess 45a in the skirt portion 43 and the line clip 70.

As shown in FIG. 3, the sheet member 80 is configured to be able to come into contact with the second surface 73d. The sheet member 80 is also configured to be able to make contact with the first surface 73c. The sheet member 80 is substantially formed in a plate shape.

The sheet member 80 has a first hole 80a and a second hole 80b, which are examples of holes. The first hole 80a is formed in a polygonal shape. Here, the first hole 80a is formed in a substantially rectangular shape. The first hole 80a is disposed to face the through-hole 45b in the skirt portion 43. The mounting member 71 of the line clip 70 is inserted in the first hole 80a.

The fishing line can be arranged in the second hole 80b. The first projection 74 and the second projection 75 are arranged in the second hole 80b. The central portion of the groove 76 of the line clip 70 is disposed spaced apart from the bottom BL of the recess 45a of the skirt portion 43 via the second hole 80b. The fishing line is disposed between the central portion of the groove 76 of the line clip 70 and the bottom BL of the recess 45a in the skirt portion portion 43.

[Clip of Fishing Line]

After removing the spinning reel 1 from the fishing rod, the distal end of the fishing line is clipped in the line clip 70 so that the fishing line does not unravel from the spool 4. In the following description, for ease of explanation, the case where the fishing line has a small diameter and the case where the fishing line has a large diameter will be described separately.

Figure 7A:
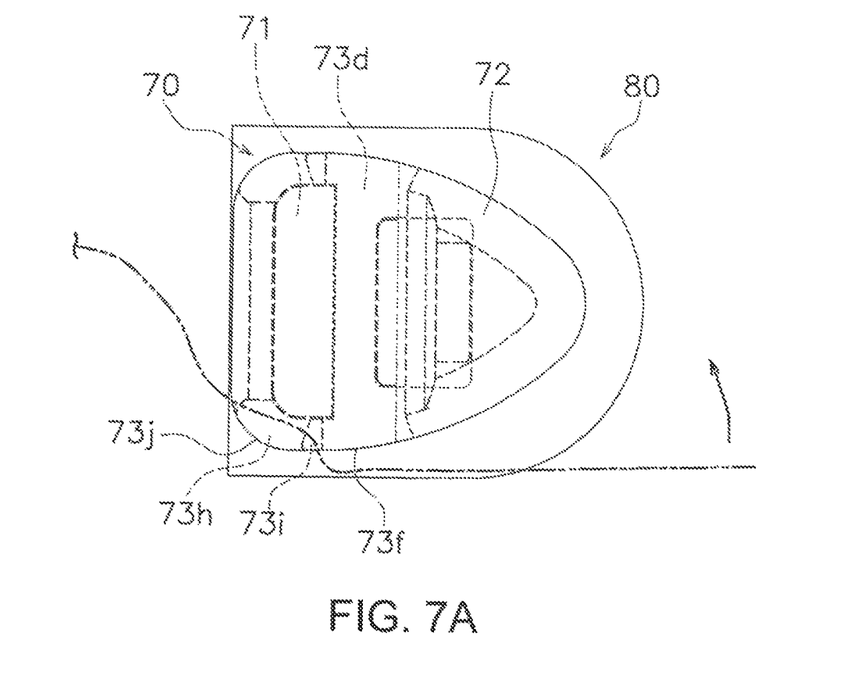
FIG. 7A is a drawing for explaining a mode of clipping a large-diameter fishing line.

For example, when the fishing line has a large diameter, as shown in FIG. 7A, the fishing line is first guided by the guide surface 73h from the corner 73j of the mounting end 73a of the clip body 72 toward the mounting member 71. Then, the large-diameter fishing line is guided from the guide surface 73h to the connection surface 73i, to be disposed on the outer side of the non-tapered portion 73f.

Figure 7B:
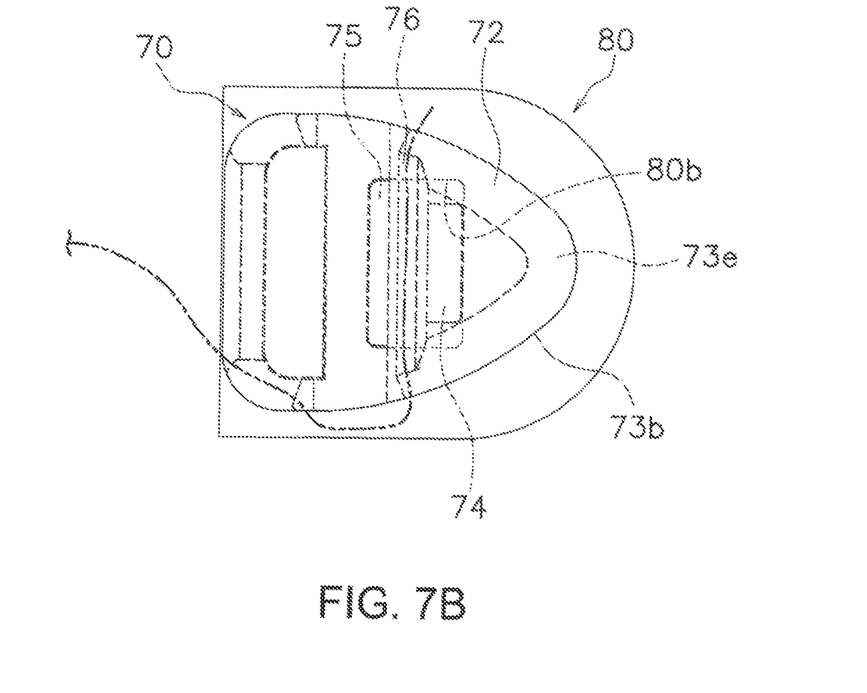
FIG. 7B is a drawing for explaining a mode of clipping a large-diameter fishing line.

Next, as shown in FIG. 7B, the large-diameter fishing line is guided by the tapered portion 73e from the insertion end 73b of the clip body 72 toward the first projection 74. The large-diameter fishing line then passes between the first projection 74 and the sheet member 80. Thereupon, the fishing line is disposed in the groove 76 between the first projection 74 and the second projection 75.

A portion of the large-diameter fishing line is disposed between the bottom of the central portion of the groove 76 and the bottom of the recess 45a in the skirt portion 43 via the second hole 80b in the sheet member 80. Further, other portions of the fishing line are sandwiched by the respective bottoms of both ends of the groove 76 and the surface of the sheet member 80. Movement of the large-diameter fishing line toward the guide side is prevented by the first projection 74, and as a result there no disengagement of the clipping of the fishing line. Moreover, movement of the fishing line to the mounting side is prevented by the second projection 75, and so the clipping position of the large-diameter fishing line is stable, and the large-diameter fishing line is securely clipped by the line clip 70.

Figure 6A:
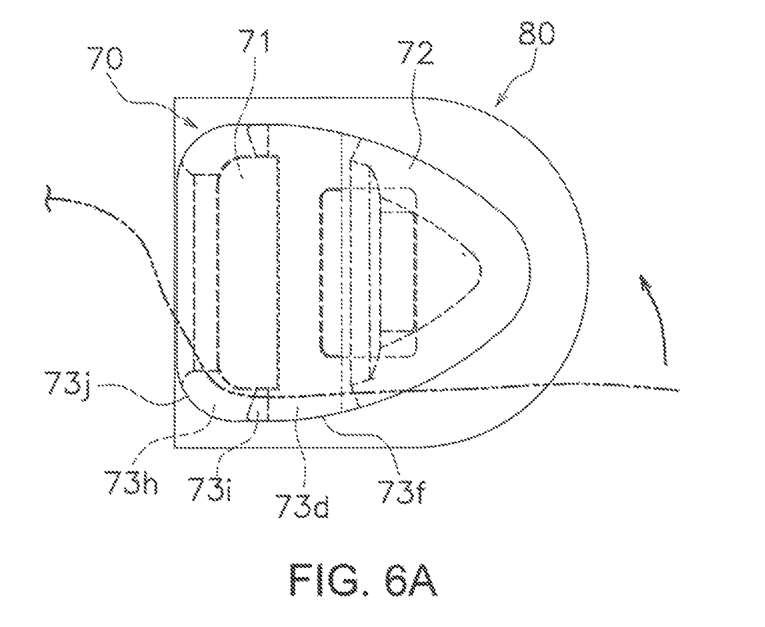
FIG. 6A is a drawing for explaining a mode of clipping a small-diameter fishing line.

On the other hand, when the fishing line has a small diameter, as shown in FIG. 6A, the small-diameter fishing line is first guided from the corner 73j of the mounting end 73a of the clip body 72 by the guide surface 73h to the mounting member 71. The small-diameter fishing line is then guided from the guide surface 73h to the connection surface 73i, and guided from the connection surface 73i to the second surface 73d. As a result, the fishing line is temporarily sandwiched by the second surface 73d on the non-tapered portion 73f and the surface of the sheet member 80.

Figure 6B:
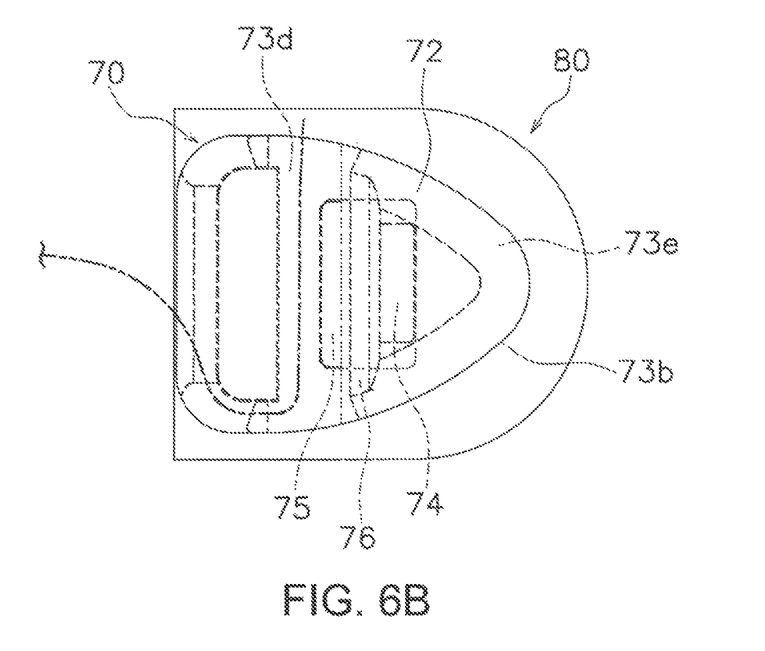
FIG. 6B is a drawing for explaining a mode of clipping a small-diameter fishing line.

Next, as shown in FIG. 6B, the small-diameter fishing line is guided by the tapered portion 73e from the insertion end 73b of the clip body 72 toward the first projection 74. The small-diameter fishing line passes between the first projection 74 and the sheet member 80, between the groove 76 and the sheet member 80, and between the second projection 75 and the sheet member 80. The fishing line is then sandwiched by the second surface 73d and the surface of the sheet member 80. Movement of the small-diameter fishing line toward the guide side is prevented by the second projection 75, and as a result there is no further movement of the fishing line between the groove 76 and the sheet member 80 leading to disengagement of the clipping. Therefore, the clipping position of the small-diameter fishing line is stable, and the small-diameter fishing line is securely clipped by the line clip 70.

That is, in the line clip 70, when the fishing line has a small diameter, the fishing line is clipped by the second surface 73d and the surface of the sheet member 80. On the other hand, when the fishing line has a large diameter, the fishing line is clipped by the bottom of both ends of the groove 76 and the surface of the sheet member 80 in the state of being disposed at the bottom of the central portion of the groove 76 and on the surface of the skirt portion 43 (the bottom of the recess 45a). As described above, regardless of whether the fishing line has a small diameter or a large diameter, the clipping position of the fishing line is stable and the fishing line can be securely clipped by the line clip 70.

Thus, the clip body serves as a clipping means for clipping fishing line that defines, at least in part, and in cooperation with other elements, first fishing line clipping means and second fishing line clipping means that are different from one another. The second surface 73d between the mounting member 71 and the first projection 75 is one example of a first means for clipping fishing line, and the groove 76 is one example of a second means for clipping fishing line.

The connection surface 73i not only guides the fishing line from the second surface 73d (guide surface 73h) to the guide surface 73h (second surface 73d) when clipping the fishing line, but also is useful for preventing the fishing line from catching on the second surface 73d when disengaging the clipped fishing line. Particularly in the case of a small-diameter fishing line, even when the fishing line is clipped at the mounting member 71 side of the line clip 70, the fishing line is less prone to be bent, and so the fishing line can be clipped securely without imposing a burden (load) on the fishing line.

[Modification]

In the present embodiment, an example was illustrated in which the line clip 70 is disposed on the skirt portion 43 with the sheet member 80 interposed therebetween. Instead, the line clip 70 may be disposed on a skirt portion 143 without using the sheet member 80.

Figure 8:
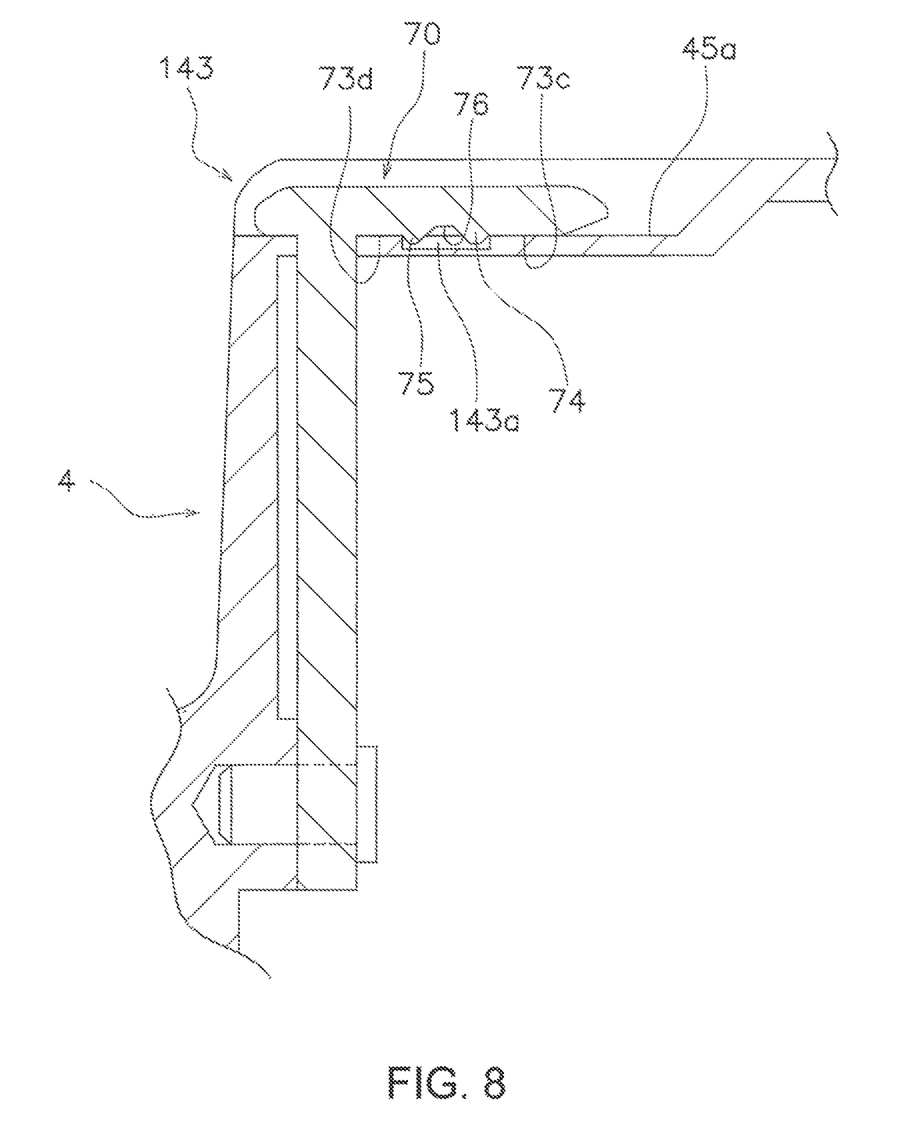
FIG. 8 is an enlarged cross-sectional view of a line clip mounted to the spool in a modification of the present disclosure.

In this case, as shown in FIG. 6, the skirt portion 143 has a hole 143a (an example of a hole) in which the fishing line can be arranged. The hole 143a is formed in a concave shape at the bottom of the recess 45a. The fishing line can be arranged between the groove 76 of the line clip 70 and the hole 143a. The first projection 74 and the second projection 75 of the line clip 70 are disposed in the hole 143a. Although in this example the hole 143a is a bottomed hole, the hole 143a may also be a through-hole.

The skirt portion 143 is configured to be able to come into contact with the second surface 73d of the line clip 70. Specifically, in the state where the line clip 70 is mounted to the spool 4, the bottom of the recess 45a of the skirt portion 143 is in contact with the first surface 73c and the second surface 73d of the line clip 70.

In this configuration, the fishing line is clipped by the line clip 70 as in the above embodiment. For example, when the fishing line has a small diameter, the fishing line is sandwiched between the second surface 73d of the line clip 70 and the outer peripheral surface of the skirt portion 143. On the other hand, when the fishing line has a large diameter, a portion of the fishing line is arranged between the bottom of the central portion of the groove 76 and the bottom of the hole 143a. Other portions of the fishing line are sandwiched by the bottom of both ends of the groove 76 and the outer peripheral surface of the skirt portion 143. Even with such a configuration, the fishing line can be clipped to the spool 4 using the line clip 70 similarly to the above-described embodiment.

[Other Embodiments]

Although an embodiment of the present disclosure has been described in detail above, it is to be understood that the present disclosure is not limited to the embodiment, and various modifications may be made within a scope not departing from the gist of the disclosure. In particular, the embodiment and modifications described herein can be arbitrarily combined as needed.

(a)

In the present embodiment, an example has been described in which the clip body 72 and the mounting member 71 are integrally formed, but the clip body 72 and the mounting member 71 may be formed separately. In this case, the clip body 72 is molded with a thermoplastic resin such as an elastomer. The mounting member 71 may be made of the same material as the clip body 72 or may be made of a material different from that of the clip body 72.

(b)

In order to facilitate the description of the present disclosure in this specification, the mode of clipping a fishing line has been described separately for the case where the fishing line has a small diameter and the case where the fishing line has a large diameter. However, irrespective of the thickness of the fishing line, it is possible to sandwich the fishing line between the second surface 73*d* and the portion facing the second surface 73*d*, and between the groove 76 and the portion facing the groove 76.

Here, the portion facing the second surface 73*d* and the portion facing the groove 76 correspond to the surface of the sheet member 80. In the modification, the portion facing the second surface 73*d* and the portion facing the groove 76 correspond to the outer peripheral surface of the skirt portion 143.

(c)

In the present embodiment, an example has been described in which the fishing line is disposed in the second hole 80*b* (or the hole 143*a*). In this case, the fishing line may be merely arranged in the second hole 80*b* (or the hole 143*a*), or may be sandwiched by the bottom of the groove 76 and the outer peripheral surface of the skirt portion 43 (or the skirt portion 143) while disposed in the second hole 80*b* (or the hole 143*a*).

EXPLANATION OF REFERENCE NUMERALS

- 1 Spinning reel
- 4 Spool
- 41 Bobbin trunk
- 43 Skirt portion
- 70 Line clip
- 71 Mounting member
- 72 Clip body
- 73 Main body
- 74 First projection
- 75 Second projection
- 76 Groove
- 80 Sheet
- 80*a* First hole
- 80*b* Second hole (example of hole)
- 143*a* Hole (example of hole)

What is claimed is:

1. A line clip for a spinning reel, the line clip comprising:
   a mounting member that is mountable to a spool of the spinning reel; and
   a clip body that is able to clip a fishing line, the clip body comprising:
   a main body that extends from the mounting member,
   a first projection that projects from the main body,
   a second projection that projects from the main body between the mounting member and the first projection, and
   a recess that is formed in a concave shape in the main body between the first projection and the second projection.

2. The line clip for the spinning reel according to claim 1, wherein the main body includes:
   a tapered portion that is provided between an outer edge and the recess; and
   a non-tapered portion that is provided between the mounting member and the recess.

3. The line clip for the spinning reel according to claim 1, wherein
   the main body includes a guide surface for guiding the fishing line from a corner of the outer edge to the mounting member.

4. The line clip for the spinning reel according to claim 3, wherein
   the main body further includes a connection surface that connects the guide surface and a surface that is formed between the mounting member and the second projection.

5. The line clip for the spinning reel according to claim 1, wherein the clip body is made of a thermoplastic resin.

6. A spool for a spinning reel, comprising:
   a bobbin trunk adapted to allow a fishing line to be wound on an outer peripheral surface thereof;
   a skirt portion provided on the bobbin trunk and configured to have a diameter larger than a diameter of the bobbin trunk; and
   a line clip disposed on the skirt portion, the line clip comprising:
   a mounting member that is mountable to a spool of the spinning reel, and
   a clip body that is able to clip the fishing line, the clip body comprising:
   a main body that extends from the mounting member,
   a first projection that projects from the main body,
   a second projection that projects from the main body between the mounting member and the first projection, and
   a recess that is formed in a concave shape in the main body between the first projection and the second projection.

7. The spool for the spinning reel according to claim 6, further comprising:
   a sheet member disposed between the skirt portion and the line clip and having a hole in which the fishing line can be disposed.

8. The spool for the spinning reel according to claim 7, wherein
   the fishing line is disposed in the hole, between the recess and the skirt portion.

9. The spool for the spinning reel according to claim 7, wherein
   the first projection and the second projection are disposed in the hole.

10. The spool for the spinning reel according to claim 7, wherein
    the sheet member is configured to make contact with a surface of the main body formed between the mounting member and the second projection, and
    the fishing line is disposed between the surface and the sheet member.

11. The spool for the spinning reel according to claim 6, wherein
    the skirt portion has a hole in which the fishing line can be disposed.

12. The spool for the spinning reel according to claim 11, wherein
    the fishing line is disposed between the hole and the recess.

13. The spool for the spinning reel according to claim 11, wherein
   the first projection and the second projection are disposed in the hole.

14. The spool for the spinning reel according to claim 11, wherein
   the skirt portion is configured to make contact with the surface of the main body formed between the mounting member and the second projection, and
   the fishing line is disposed between the surface of the main body and a surface of the skirt portion.

* * * * *